United States Patent
Covington

(10) Patent No.: US 12,415,382 B2
(45) Date of Patent: Sep. 16, 2025

(54) MOTORCYCLE WHEEL SIZE ADAPTER

(71) Applicant: Charles Bradley Covington, Batesville, AR (US)

(72) Inventor: Charles Bradley Covington, Batesville, AR (US)

( * ) Notice: Subject to any disclaimer, the term of this patent is extended or adjusted under 35 U.S.C. 154(b) by 411 days.

(21) Appl. No.: 18/296,486

(22) Filed: Apr. 6, 2023

(65) Prior Publication Data

US 2024/0336089 A1 Oct. 10, 2024

(51) Int. Cl.
*B60B 27/00* (2006.01)
*B60B 27/02* (2006.01)
*B60B 27/04* (2006.01)
*B60B 37/08* (2006.01)

(52) U.S. Cl.
CPC .......... *B60B 27/0057* (2013.01); *B60B 27/02* (2013.01); *B60B 27/04* (2013.01); *B60B 37/08* (2013.01)

(58) Field of Classification Search
CPC ..... B60B 37/08; B60B 27/02; B60B 27/0057; B60B 27/04
See application file for complete search history.

(56) References Cited

U.S. PATENT DOCUMENTS

| | | | | |
|---|---|---|---|---|
| 5,873,636 A | * | 2/1999 | Messina | F16F 15/324 301/5.21 |
| 6,318,810 B1 | * | 11/2001 | Miyake | B62L 1/00 188/218 XL |
| 12,090,781 B2 | * | 9/2024 | Moore | B60B 27/0057 |
| 2007/0090685 A1 | * | 4/2007 | Sekiguchi | B60B 27/02 301/64.101 |
| 2020/0340534 A1 | * | 10/2020 | Yu | F16C 33/1055 |
| 2024/0316988 A1 | * | 9/2024 | Romanetto | B60B 27/0094 |

FOREIGN PATENT DOCUMENTS

JP 59179403 A * 10/1984 ............. B60B 27/02

* cited by examiner

*Primary Examiner* — Jason R Bellinger
(74) *Attorney, Agent, or Firm* — Dunlap Bennett & Ludwig, PLLC; Anna L. Kinney

(57) ABSTRACT

A motorcycle wheel adapter includes a metal tube; a sprocket mounting plate joined to the metal tube near one end; a brake assembly mounting plate joined to the metal tube near another end; and a wheel mounting plate joined to the metal tube in between. The wheel mounting plate is closer to the brake assembly mounting plate than to the sprocket mounting plate. The tube has a first end, a second end, and a longitudinally formed bore. The sprocket mounting plate, the brake assembly mounting plate, and the wheel mounting plate have evenly spaced holes around their perimeters. A rear wheel assembly includes a sprocket, a wheel, a brake drum, and the motorcycle wheel adapter. The motorcycle wheel adapter converts the motorcycle from a narrow, tube type, spoked motorcycle wheel to a more offroad-capable and reliable ATV style tire and wheel allows for more reliability, easier repairs, and more traction.

10 Claims, 4 Drawing Sheets

MOTORCYCLE WHEEL SIZE ADAPTER

BACKGROUND OF THE INVENTION

The present invention relates to motorcycle wheels and tires and, more particularly, to a motorcycle wheel size adapter.

With a prior art motorcycle tire and wheel design, reliability and durability problems exist with the use of tubes and wheel spokes. Traction is minimized with the small, narrow tire as well. On the Yamaha TW200 motorcycle, a wider rear tire, with dimensions of 14×3.5", is used by the manufacturer. For more traction and offroad capability, the user may desire an even wider rear tire than the manufacturer wheel is designed to support. All-terrain vehicles (ATV) have 12×7" wheels and tires that are tubeless and easily repaired, and compared to a motorcycle tire are wider, more flexible, and make for much more offroad traction. However, ATV wheels generally do not fit onto a motorcycle rear assembly.

As can be seen, there is a need for an adapter enabling use of larger wheels, such as ATV wheels, on a motorcycle.

SUMMARY OF THE INVENTION

In one aspect of the present invention, a motorcycle wheel adapter comprises a metal tube having a first end, a second end, and a bore formed longitudinally therethrough; a sprocket mounting plate, having a first plurality of evenly spaced apertures around a perimeter thereof, joined to the metal tube proximate the first end; a brake assembly mounting plate, having a second plurality of evenly spaced apertures around a perimeter thereof, joined to the metal tube proximate the second end and distal to the first end; and a wheel mounting plate, having a third plurality of evenly spaced apertures around a perimeter thereof, joined to the metal tube therebetween, wherein the wheel mounting plate is closer to the brake assembly mounting plate than to the sprocket mounting plate.

In another aspect of the present invention, a rear wheel assembly comprises a sprocket, a wheel, a brake drum, and the motorcycle wheel adapter. The sprocket is mounted on the metal tube and fastened to the sprocket mounting plate; the brake drum is mounted on the metal tube and fastened to the brake assembly mounting plate; and the wheel is mounted around the metal tube and fastened to the wheel mounting plate.

Converting the prior art narrow, tube type, spoked motorcycle wheel, such as the wheel on the Yamaha TW200, to a much more offroad-capable and more reliable ATV style tire and wheel allows for more reliability, easier repairs, and more traction.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a motorcycle wheel size adapter comprising a welded hub assembly that replaces a motorcycle rear wheel assembly, enabling use of a wheel and tire from an all-terrain vehicle (ATV). The motorcycle may be, for example, a Yamaha TW200.

The inventive adapter may be manufactured by welding steel components together. In an embodiment, the adapter is a weldment made up of a machined steel tube and three separate laser cut steel plates that each provide mounting surfaces for the rear wheel components of the motorcycle, including the wheel, the drive sprocket, and the brake assemblies. Alternatively, steel or another metal, such as aluminum, magnesium, etc., may be molded into the components or into the adapter as a whole.

The wheel sizes and bolt patterns are not particularly limited.

To use the inventive adapter, the user may remove the Yamaha TW200 original rear wheel assembly that includes a wheel and tire, tube, spokes, and a center hub section. The user may then replace these parts by installing the inventive hub assembly with an ATV-style tire and wheel.

Figure 1:
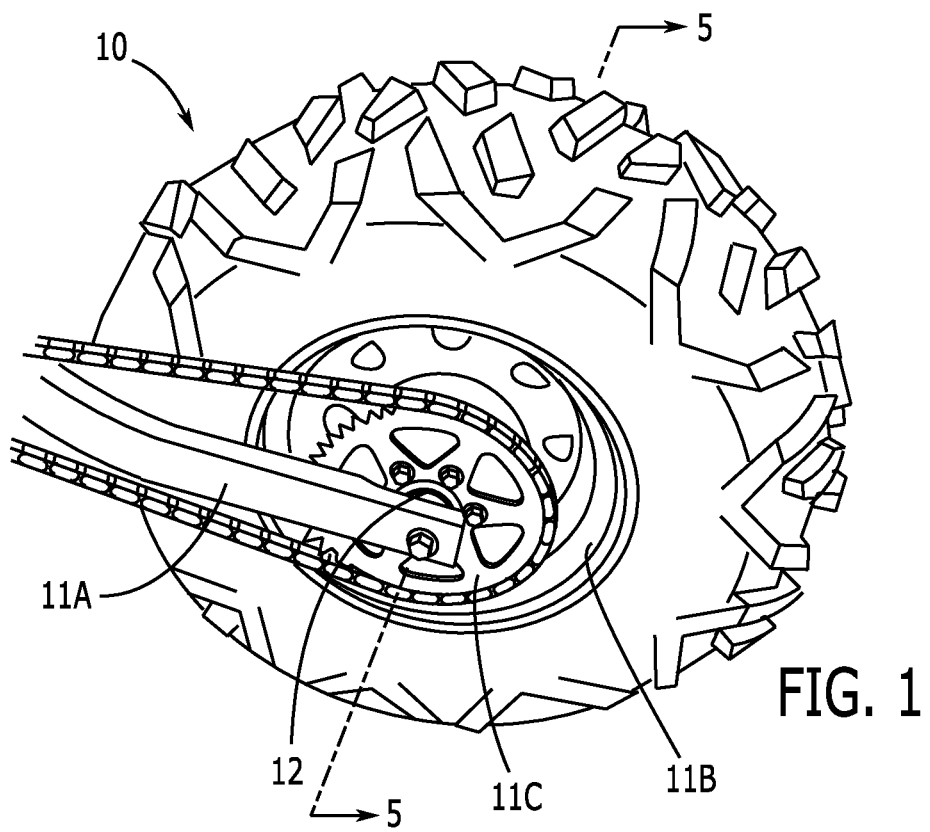
FIG. 1 is a front perspective view of a wheel size converter, shown in use.
Figure 2:
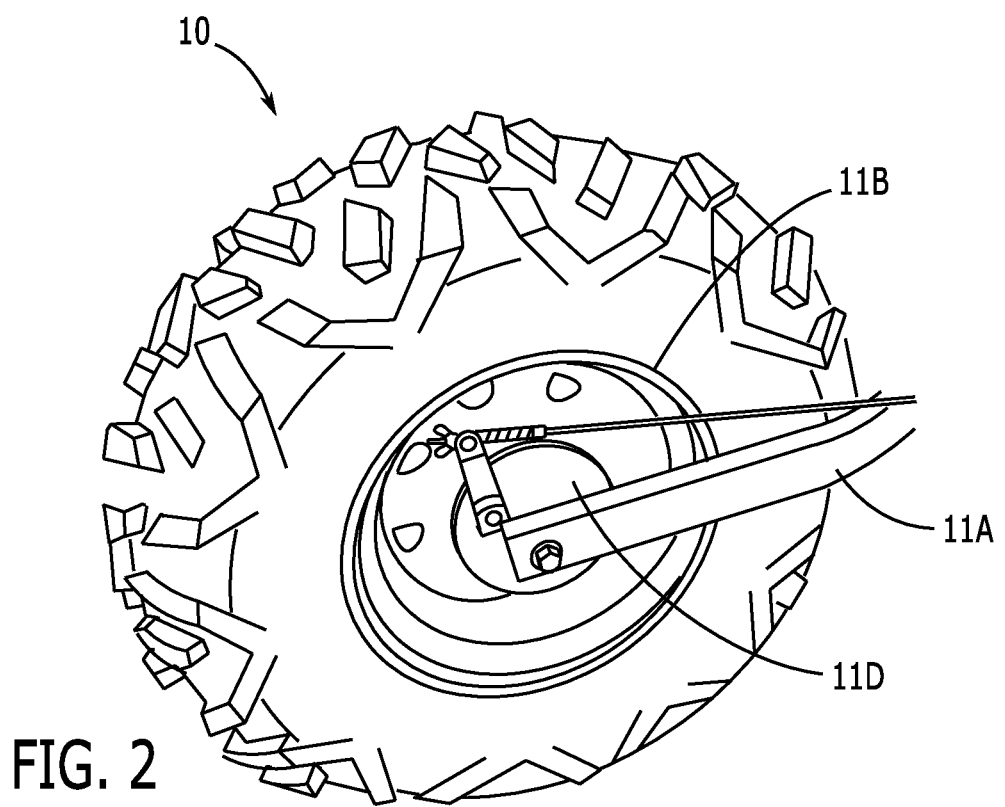
FIG. 2 is a rear perspective view thereof, shown in use.

Referring to FIGS. 1 through 5, a wheel size converter 10 or adapter hub according to an embodiment of the present invention is shown in use. FIG. 1 shows a drive side, with a sprocket 11C mounted on a machined steel tube or axle 12 between the wheel 11B and a motorcycle suspension or swingarm 11A, while FIG. 2 shows a brake side, with a brake drum 11D between the wheel 11B and the motorcycle suspension 11A. Each of the components has a perimeter.

Figure 3:
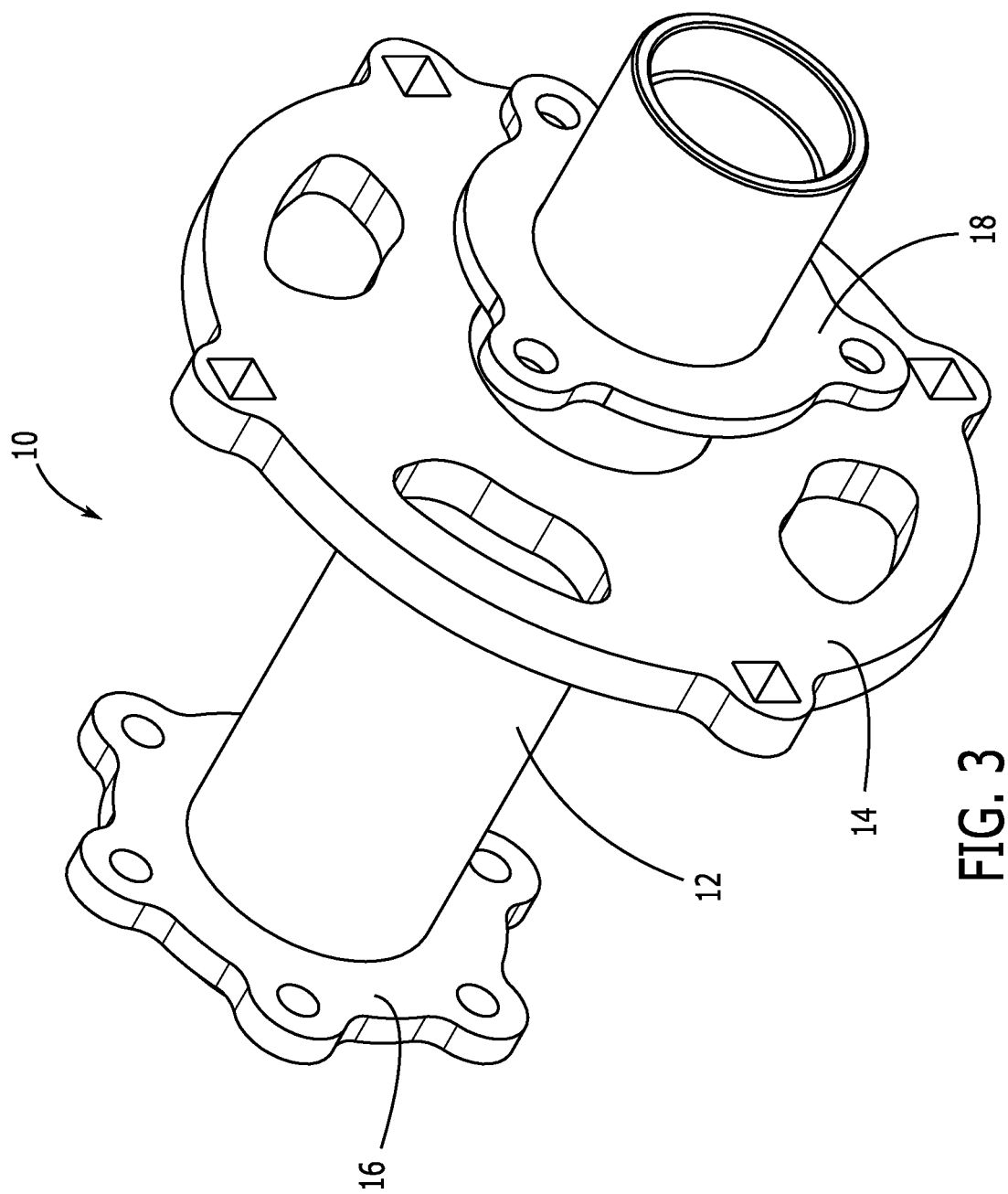
FIG. 3 is a detail perspective view thereof.

As seen in FIG. 3, the inventive wheel adapter 10 has a drive sprocket mounting plate 16 or flange proximate a first end of the machined steel tube 12, a brake assembly mounting plate 18 or flange proximate a second end of the machined steel tube 12, and a wheel mounting plate 14 positioned on the machined steel tube 12 therebetween, closer to the brake assembly mounting plate 18 than to the drive sprocket mounting plate 16. The machined steel tube 12 has a longitudinal bore extending therethrough. The drive sprocket mounting plate 16 has multiple bolt holes evenly spaced around a perimeter of the plate 16, configured with the same bolt pattern as the sprocket 11C. The brake assembly mounting plate 18 has multiple bolt holes evenly spaced around a perimeter of the plate 18, configured with the same bolt pattern as the brake drum 11D. The wheel mounting plate 14 has a larger diameter than the drive sprocket mounting plate 16 or the brake assembly mounting plate 18 and has multiple evenly spaced apertures around a perimeter of the plate 14 aligned to apertures on the wheel 11B. The plate may have evenly spaced cutout regions between the steel tube 12 and the plate 14 perimeter, for example to reduce weight and to reduce materials costs.

Figure 4:
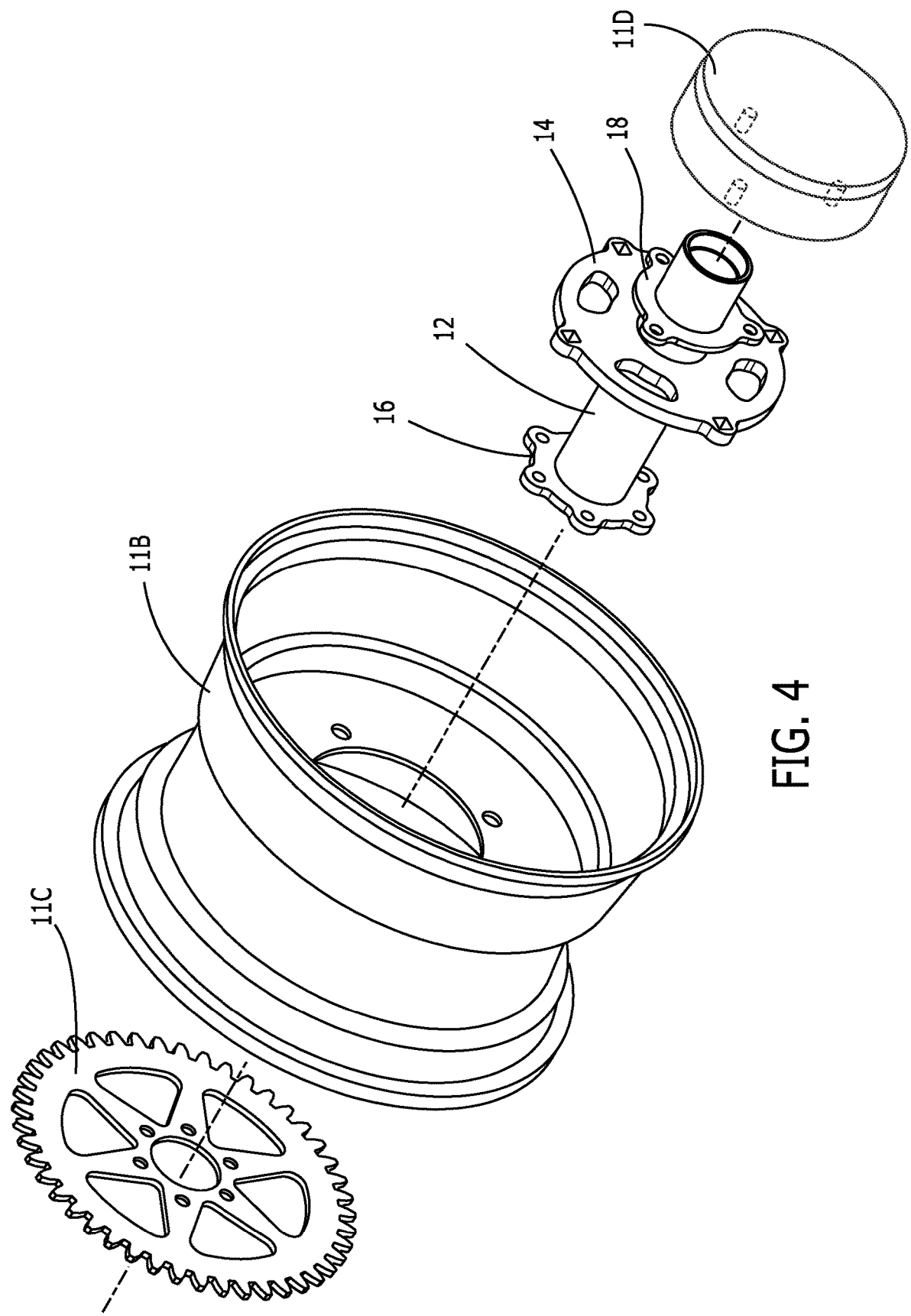
FIG. 4 is an exploded perspective view thereof.

The wheel size converter 10 may be inserted into the center of a wheel 11B and the corresponding plate 14 may be fastened to the wheel 11B with bolts via aligned bolt holes, as shown in FIG. 4. A first end of the steel tube 12 may be inserted into the center of the sprocket 11C and the corresponding plate 16 may be fastened to the sprocket 11C with bolts via aligned bolt holes. A second end of the machined steel tube 12 may be inserted into the brake drum 11D and the corresponding plate 18 may be fastened to the brake drum 11D with bolts by way of aligned bolt holes.

Figure 5:
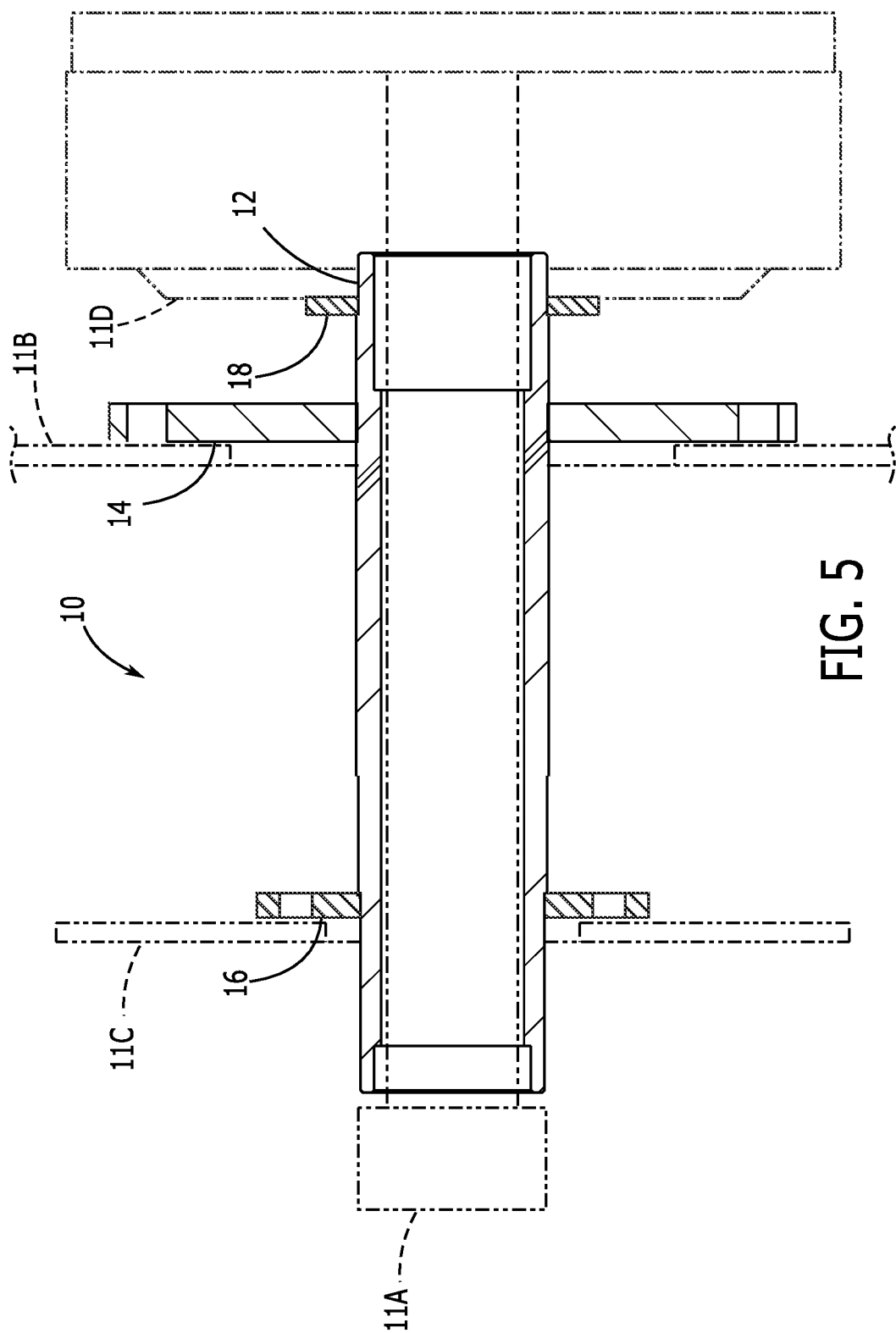
FIG. 5 is a cross-sectional view, taken along line 5-5 of FIG. 1.

FIG. 5 illustrates the converter 10 assembled on the motorcycle, with the wheel 11B mounted to the wheel mounting plate 14, the sprocket 11C mounted to the drive sprocket mounting plate 16, and the brake drum 11D mounted to the brake assembly mounting plate 18. The tube 12 is mounted to the motorcycle suspension 11A. The thickness of the wheel mounting plate 14 may be greater than the thickness of the sprocket mounting plate 16 or the brake drum mounting plate 18. The steel tube may have a larger inner diameter at each end thereof than through the remaining central bore.

It should be understood, of course, that the foregoing relates to exemplary embodiments of the invention and that modifications may be made without departing from the spirit and scope of the invention as set forth in the following claims.

What is claimed is:

1. A motorcycle wheel adapter, comprising:
   a metal tube having a first end, a second end, and a bore formed longitudinally therethrough;
   a sprocket mounting plate, having a first plurality of evenly spaced apertures around a perimeter thereof, joined to the metal tube proximate the first end;
   a brake assembly mounting plate, having a second plurality of evenly spaced apertures around a perimeter thereof, joined to the metal tube proximate the second end and distal to the first end;
   and a wheel mounting plate, having a third plurality of evenly spaced apertures around a perimeter thereof, joined to the metal tube between the sprocket mounting plate and the brake assembly mounting plate, wherein the wheel mounting plate is closer to the brake assembly mounting plate than to the sprocket mounting plate.

2. The motorcycle wheel adapter of claim 1, wherein the wheel mounting plate has a larger diameter than the sprocket mounting plate and the brake assembly mounting plate.

3. The motorcycle wheel adapter of claim 1, wherein the wheel mounting plate further has evenly spaced cutout regions between the metal tube and the wheel mounting plate perimeter.

4. The motorcycle wheel adapter of claim 1, wherein the wheel mounting plate has a thickness greater than a thickness of the sprocket mounting plate and a thickness of the brake drum mounting plate.

5. A rear wheel assembly comprising a sprocket, a wheel, a brake drum, and the motorcycle wheel adapter of claim 1, wherein:
   the sprocket is mounted on the metal tube and fastened to the sprocket mounting plate;
   the brake drum is mounted on the metal tube and fastened to the brake assembly mounting plate; and
   the wheel is mounted around the metal tube and fastened to the wheel mounting plate.

6. The rear wheel assembly of claim 5, wherein the sprocket mounting plate and the sprocket have aligned bolt patterns.

7. The rear wheel assembly of claim 5, wherein the brake assembly mounting plate and the brake drum have aligned bolt patterns.

8. The rear wheel assembly of claim 5, wherein the wheel mounting plate and the wheel have aligned bolt patterns.

9. The rear wheel assembly of claim 5, wherein the first end of the metal tube is inserted into a center of the sprocket.

10. The rear wheel assembly of claim 5, wherein the second end of the metal tube is inserted into a center of the brake drum.

* * * * *